M. F. WILDAU.
AUTOMOBILE BODY.
APPLICATION FILED SEPT. 6, 1918.
1,297,764.
Patented Mar. 18, 1919.
2 SHEETS—SHEET 1.
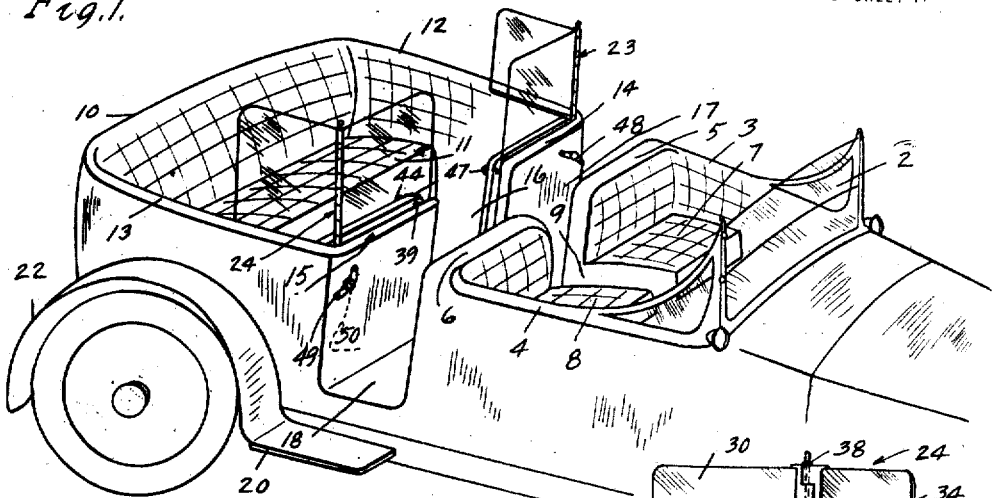
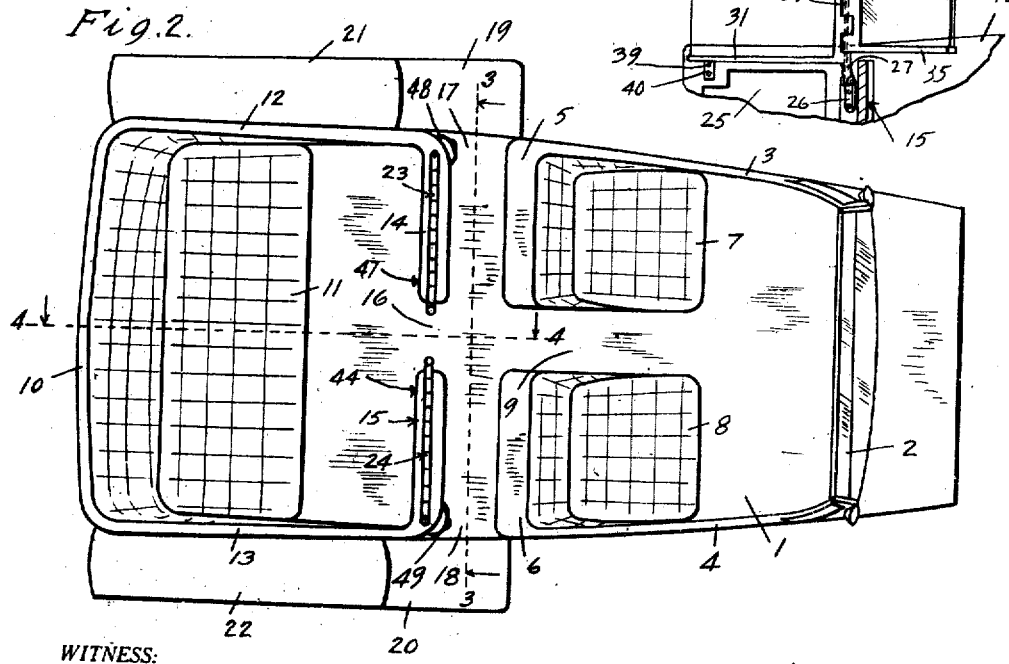
WITNESS:
INVENTOR.
Michael F. Wildau,
BY Hazard & Miller
ATTORNEYS.

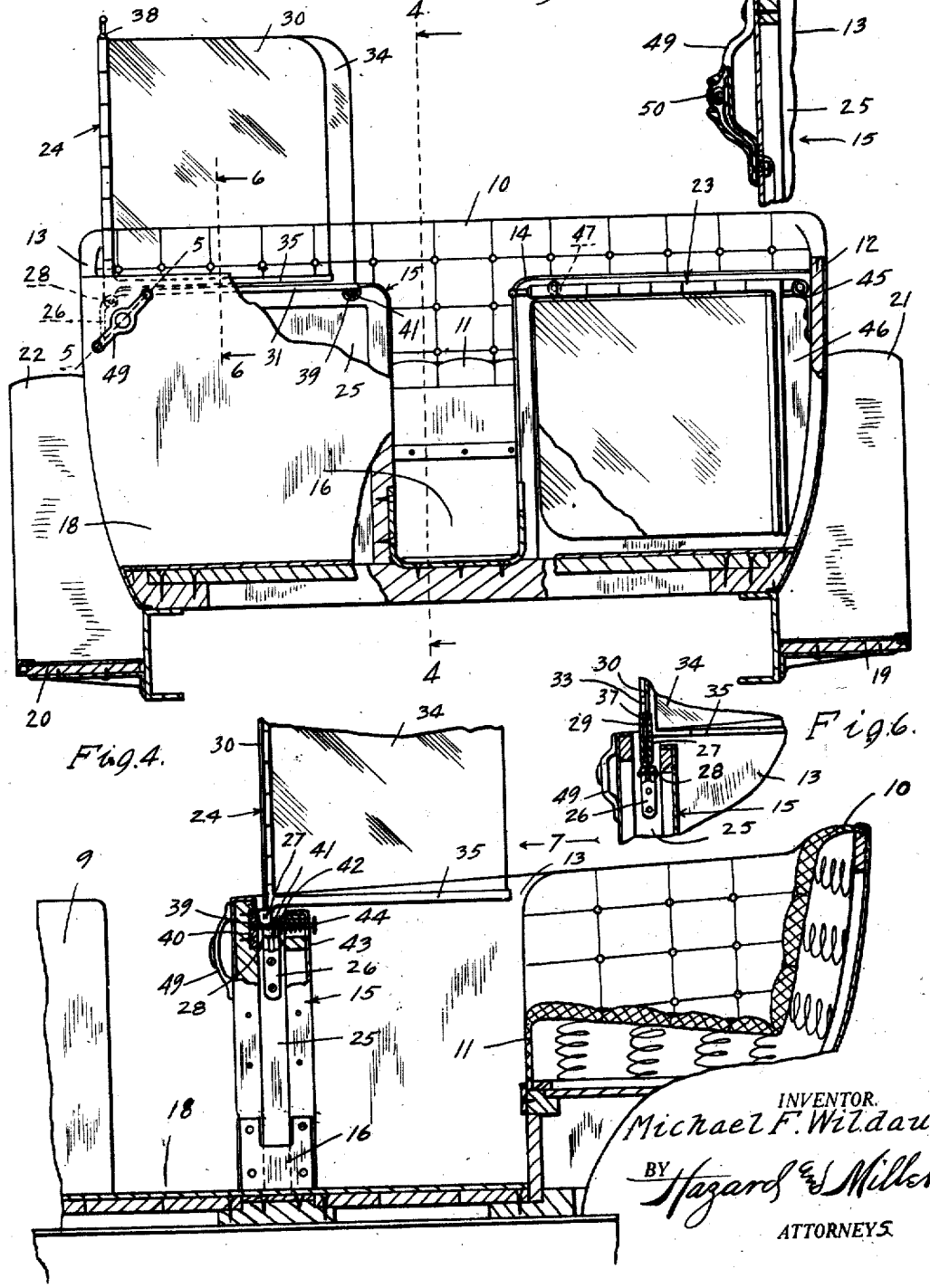

UNITED STATES PATENT OFFICE.

MICHAEL FRANCIS WILDAU, OF LOS ANGELES, CALIFORNIA.

AUTOMOBILE-BODY.

1,297,764.   Specification of Letters Patent.   Patented Mar. 18, 1919.

Application filed September 6, 1918. Serial No. 252,957.

*To all whom it may concern:*

Be it known that I, MICHAEL FRANCIS WILDAU, a citizen of the United States, residing at Los Angeles, in the county of Los Angeles and State of California, have invented new and useful Improvements in Automobile-Bodies, of which the following is a specification.

My object is to make an improved automobile body, and my invention consists of the novel features herein shown, described and claimed.

Figure 1 is a perspective view of an automobile body embodying the principles of my invention.

Fig. 2 is a top plan view of the body shown in Fig. 1.

Fig. 3 is a vertical cross section on the line 3—3 of Fig. 2 and looking in the direction indicated by the arrows.

Fig. 4 is a fragmentary, vertical, longitudinal section on the lines 4—4 of Figs. 2 and 3 and looking in the direction indicated by the arrows.

Fig. 5 is a fragmentary sectional detail of one of the illuminated handholds, the view being taken on the line 5—5 of Fig. 3.

Fig. 6 is a fragmentary sectional detail on the line 6—6 of Fig. 3.

Fig. 7 is a fragmentary elevation of the folding wind shield construction as seen in the direction indicated by the arrow 7 in Fig. 4.

The floor 1 of the automobile body is flat and may be of the usual size. The wind shield and dash board construction 2 extends upwardly across the front end of the floor 1, and the side walls 3 and 4 extend backwardly from the ends of the dash board along the sides of the floor 1, and the backs 5 and 6 of the front seats 7 and 8 extend inwardly from the rear ends of the sides 3 and 4, there being a central longitudinal passage 9 between the inner ends of the backs 5 and 6 and between the seats 7 and 8. The back 10 of the rear seat 11 extends upwardly across the rear end of the floor 1 and the side walls 12 and 13 extend forwardly from the ends of the back 10 along the sides of the floor 1, and walls 14 and 15 extend inwardly from the forward ends of the walls 12 and 13, there being a passage 16 between the inner ends of the walls 14 and 15 in line with the passage 9, and there being a passage 17 between the back 5 and the wall 14, and a passage 18 between the back 6 and the wall 15. Running boards 19 and 20 extend forwardly from the rear mud guards 21 and 22 and form steps in front of the passages 17 and 18, so that when a person desires to enter the automobile he, or she, will step upon the running board 19 or 20 and pass inwardly through the passage 17 or 18 and then forwardly through the passage 9 or backwardly through the passage 16. In this way I have shortened the running boards and provided an automobile body in which there are no doors to the entrances to the seats. Folding wind shields 23 and 24 are constructed in connection with the walls 14 and 15 for the protection of the occupants of the rear seat 11.

The details of the folding wind shield 24 are as follows:

The wall 15 is provided with a vertical transversely extending channel 25 open at the top and at the inner side. A supporting bracket 26 is fixed in the upper outer corner of the channel 25.

The wind shield base 27 is connected to the bracket 26 by a hinge pin 28. A hinge rod 29 is fixed in the base 27 and extends upwardly. The wind shield pane 30 is mounted in a lower frame bar 31 and a vertical side bar 32. The hinge bearing members 33 extend from the side bar 32. The wind shield pane 34 is mounted upon a lower frame bar 35 and a vertical side bar 36, and hinge bearing members 37 extend from the side bar 36 and intermesh with the bearing members 33. The hinge rod 29 extends through the bearing members 33 and 37, so as to hingedly connect the panes 30 and 34 together. A nut 38 upon the upper end of the rod 29 tightens the wind shield members against the base 27 to the desired extent, so as to make a comparatively stiff joint and hold the panes in their adjusted positions. The hinge pin 28 is horizontal and transverse of the channel 25, so that when the panes 30 and 34 are folded together they will swing downwardly into the channel. A spring catch 39 is formed by mounting a bolt through the rear side of the wall 15 across the channel 25 and extending into a plate 40. The spring catch is located at the upper inner corner of the wall 15. A spring seat 41 is fixed upon the bolt. An expansive coil spring 42 is mounted upon the bolt against the spring seat 41 and in a chamber formed in the wall 15 and a plate 43 covering the face of the wall 15 forms a seat for the other end of the spring 42. The bolt extends through the plate 43 and a handle 44 is fixed upon the rear end of the bolt, so that by engaging the handle 44 and pulling backwardly the bolt may be retracted to allow the folded wind shield to swing downwardly into the channel 25, and so that when the folded wind shield is raised to a horizontal position, as in Fig. 4, the spring catch 39 will pass under the lower frame bar 31 and hold the pane 30 upright above the wall 15, and then the pane 34 may be swung backwardly and extend upwardly above the wall 13.

In a like manner, the folding wind shield 23 is hingedly connected to the bracket 45 in the channel 46 of the wall 14 and provided with a spring catch having a handle 47 corresponding to the handle 44.

Illuminated handholds 48 and 49 are secured to the front faces of the walls 14 and 15 near their upper outer corners, each of said handholds being provided with a lamp 50 so as to illuminate the passages 17 and 18 at night.

Thus I have produced an automobile body having a single entrance on each side to either the front or the rear seats, and the seats being protected from the sides by walls without doors, and there being folding wind shields for the protection of the rear seats.

Various changes may be made without departing from the spirit of my invention as claimed.

I claim:

1. An automobile body comprising a floor; two front seats extending upwardly from the floor, there being a longitudinal passage between the front seats; a rear seat above the rear end of the floor; side walls extending upwardly from the sides of the floor in front of the rear seat; and transverse walls extending upwardly from the floor and inwardly from the front ends of the side walls, there being a passage between the transverse walls and the front seats and a passage between the inner ends of the transverse walls.

2. An automobile body comprising, a floor; a rear seat above the rear end of the floor; side walls extending upwardly from the sides of the floor in front of the rear seat; transverse walls extending upwardly from the floor and inwardly from the front ends of the side walls, there being a passage between the inner ends of the transverse walls and a transverse passage across the floor in front of the transverse walls; two front seats extending upwardly from the floor, there being a longitudinal passage leading from the transverse passage forwardly between the two front seats; a dash board across the front end of the floor; and walls extending upwardly from the sides of the floor from the dash board to the front seats.

3. An automobile body comprising, a floor; a rear seat above the rear end of the floor; side walls extending upwardly from the sides of the floor in front of the rear seat; transverse walls extending upwardly from the floor and inwardly from the front ends of the side walls, there being a passage between the inner ends of the transverse walls and a transverse passage across the floor in front of the transverse walls; two front seats extending upwardly from the floor; there being a longitudinal passage leading from the transverse passage forwardly between the two front seats; a dash board across the front end of the floor; walls extending upwardly from the sides of the floor from the dash board to the front seats; and running boards extending outwardly and downwardly from the floor in front of the ends of the transverse passage.

4. In an automobile body, a floor; a rear seat mounted above the rear end of the floor; side walls extending forwardly from the rear seat; transverse walls extending inwardly from the forward ends of the side walls and having channels opening inwardly and upwardly; supporting brackets fixed in the channels; folding wind shields connected to the supporting brackets and adapted to fold and swing downwardly into the channels and swing upwardly and unfold to protect the occupants of the rear seat.

In testimony whereof I have signed my name to this specification.

MICHAEL FRANCIS WILDAU.